(12) United States Patent
Caklovic

(10) Patent No.: US 8,051,246 B1
(45) Date of Patent: Nov. 1, 2011

(54) METHOD AND APPARATUS FOR UTILIZING A SEMICONDUCTOR MEMORY OF A NODE AS A DISK CACHE

(75) Inventor: Nenad Caklovic, Palo Alto, CA (US)

(73) Assignee: Symantec Corporation, Mountain View, CA (US)

( * ) Notice: Subject to any disclaimer, the term of this patent is extended or adjusted under 35 U.S.C. 154(b) by 413 days.

(21) Appl. No.: 12/005,147

(22) Filed: Dec. 21, 2007

(51) Int. Cl.
*G06F 12/00* (2006.01)

(52) U.S. Cl. ........ 711/118; 711/114; 711/137; 711/142; 711/147; 711/170

(58) Field of Classification Search .................. None
See application file for complete search history.

(56) References Cited

U.S. PATENT DOCUMENTS

| 6,587,970 | B1* | 7/2003 | Wang et al. | 714/47 |
| 2005/0240723 | A1* | 10/2005 | Duzett | 711/113 |

* cited by examiner

*Primary Examiner* — Shawn X Gu
(74) *Attorney, Agent, or Firm* — Campbell Stephenson LLP

(57) ABSTRACT

A method and apparatus for utilizing a semiconductor memory of a node as disk cache is described. In one embodiment, a method of utilizing a semiconductor memory of a second server for a first server, comprising generating a storage access request at a first server, routing the storage access request through a communication link to a second server and performing the storage access request using a semiconductor memory of the second server.

20 Claims, 3 Drawing Sheets

METHOD AND APPARATUS FOR UTILIZING A SEMICONDUCTOR MEMORY OF A NODE AS A DISK CACHE

BACKGROUND

1. Technical Field

Embodiments of the present invention generally relate to memory management. More particularly, embodiments of the present invention relate to a method and apparatus for utilizing a semiconductor memory of a node as a disk cache.

2. Description of the Related Art

Typically, a node (e.g., a server) in a configuration (e.g., a high availability server cluster) hosts various resources (e.g., software applications, storage devices, networking components, etc.) in a computing environment. For example, nodes (e.g., servers) in a high availability server cluster generally operate as either a primary/active node or as a secondary/backup node forming a primary-secondary relationship where the secondary node supports the primary node. For example, if a failure at the primary node occurs, there is a seamless, transparent transition between the primary node and the secondary node where the secondary node hosts the various resources to the computing environment.

In this example, the various resources at the secondary node are only utilized during a failure. Hence, a semiconductor memory (e.g., a cache, a memory, a storage device) at the secondary node remains idle for most of the time until there is a failure of a primary node. As a result, during normal operation of the high availability cluster, the semiconductor memory at the secondary node is underutilized by the cluster. Consequently, in large organizations, underutilized resources may increase costs related to information technology.

Accordingly, there is a need in the art for a method and apparatus for utilizing the semiconductor memory of a secondary node as a disk cache for a primary node.

SUMMARY

Embodiments of the present invention comprise a method and apparatus of utilizing a semiconductor memory of a secondary node as a disk cache for a primary node. In one embodiment, a method of utilizing a semiconductor memory of a second server for a first server, comprising generating a storage access request at a first server, routing the storage access request through a communication link to a second server and performing the storage access request using a semiconductor memory of the second server.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
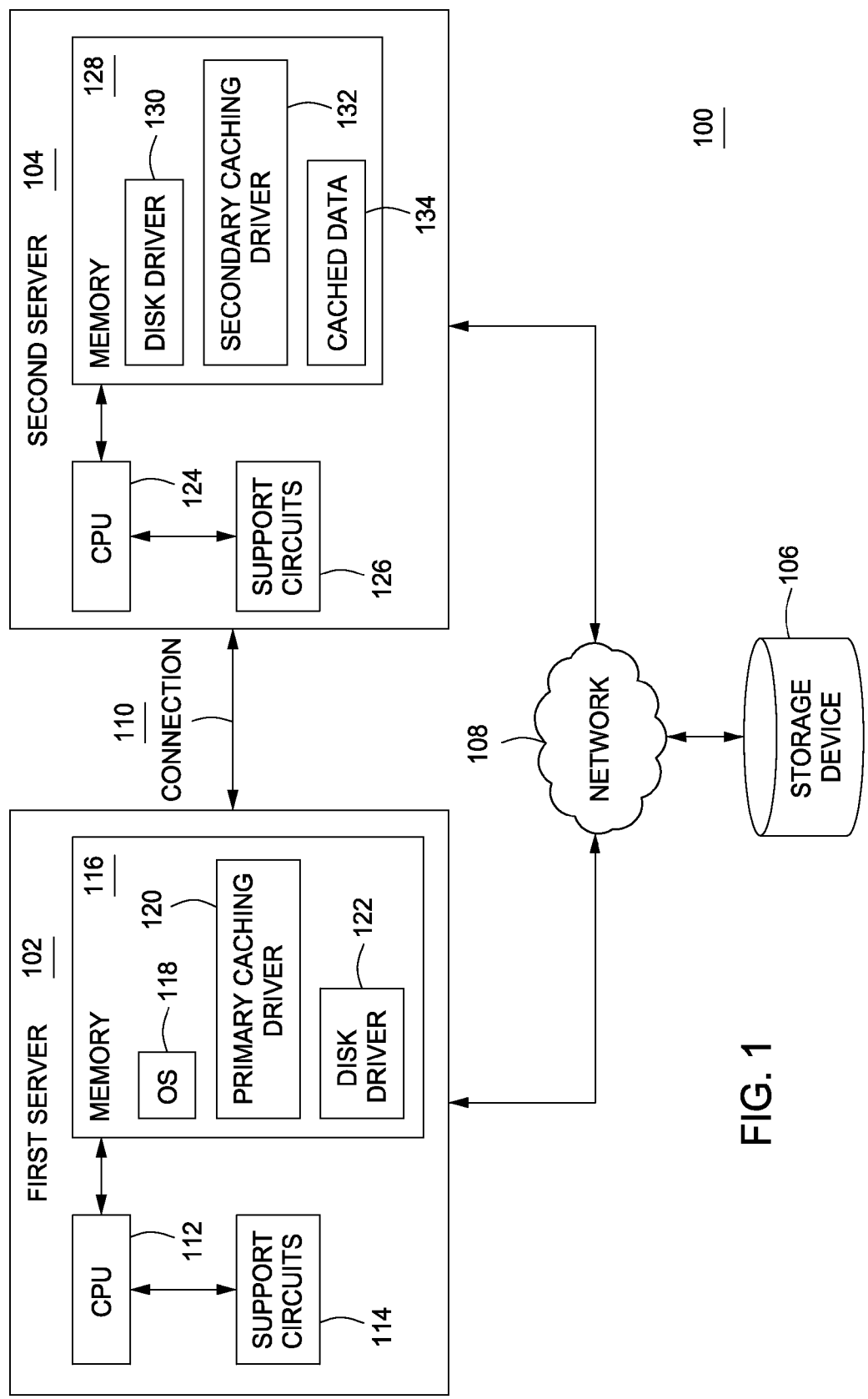
FIG. 1 is a block diagram of a system to enable use of a semiconductor memory of a secondary server, in accordance with one or more embodiments of the present invention.

FIG. 1 is a block diagram of a system 100 to enable use of a semiconductor memory of a second server. The system 100 comprises a first server 102, a second server 104 and a storage device, each coupled to one another through a network 108. Furthermore, the system 100 comprises a connection 110 (e.g., a communication bus, link and the like) between the first server 102 and the second server 104.

The first server 102 comprises a central processing unit (CPU) 112, various support circuits 114 and a memory 116. The CPU 112 may comprise one or more commercially available microprocessors or microcontrollers that facilitate data processing and storage. The various support circuits 114 facilitate the operation of the CPU 112 and comprise at least one of clock circuits, power supplies, cache, input/output circuits, and the like. The memory 116 comprises at least one of read only memory (ROM), random access memory (RAM), or any other commercially available semiconductor memory. The memory 116 includes various software packages such as an operating system 118, a primary caching driver 120, and a disk driver 122, among others.

The second server 104 comprises a central processing unit (CPU) 124, various support circuits 126 and a memory 128. The CPU 124 may comprise one or more commercially available microprocessors or microcontrollers that facilitate data processing and storage. The various support circuits 126 facilitate the operation of the CPU 124 and comprise at least one of clock circuits, power supplies, cache, input/output circuits, and the like. The memory 128 comprises at least one of read only memory (ROM), random access memory (RAM), or any other commercially available semiconductor memory. The memory includes various data, such as a cached data 134. The memory 128 includes various software packages, such as a disk driver 130, a secondary caching driver 132, among others.

The storage device 106 comprises at least one of random access memory (RAM), disk drive storage, optical storage, removable storage, or any other commercially available storage device. The storage device 106 facilitates the storage of bulk data.

The network 108 comprises a communication system that connects a computer system by wire, cable, fiber optic and/or wireless link facilitated by various types of well-known network elements, such as hubs, switches, routers, and the like. The network 108 may employ various well-known protocols to communicate information amongst the network resources. For example, the network 108 may be a part of the intranet using various communications infrastructure such as Ethernet, WiFi, WiMax, General Packet Radio Service (GPRS), and the like. As another example, the network 108 may form a portion of a Storage Network Area using various communications infrastructure such as Ethernet, Fibre Channel, InfiniBand, and the like.

The connection 110 comprises a communication system that connects a computer system by wire, cable, fiber optic and/or wireless link facilitated by various types of well-known network elements, such as hubs, switches, routers, and the like. The connection 110 may employ various well-known protocols to communicate information. For example, the connection 110 may comprise an INFINIBAND or Ethernet connection.

In one or more embodiments, the connection 110 is a point-to-point bidirectional serial link in accordance with any INFINIBAND technology. Generally, INFINIBAND is a switched fabric communications link associated with a Storage Area Network primarily used in high-performance computing. The INFINIBAND architecture is intended for the connection of nodes with high speed peripherals. The INFINIBAND architecture specification defines a connection between a processor node and a high performance I/O node such as a storage device or a secondary node (e.g., the second server 104).

The disk driver 122 and the disk driver 130 are similar software packages that facilitate access to the storage device 106 for the first server 102 and the second server 104, respectively. The disk driver 122 and/or the disk driver 130 support the communication of data blocks and/or data block requests/responses between the storage device 106 and the first server 102 and the second server 104, respectively. In one or more embodiments, the disk driver 122 and the disk driver 130 may be software in accordance with any FIBRE CHANNEL-based technology. In one or more embodiments, a plurality of storage controllers and storage networking devices (e.g., switches, hubs and the like) facilitate the storage of data from the first server 102 (e.g., a primary node) and/or the second server 104 (e.g., a secondary node).

The cached data 134 is a portion of semiconductor memory (e.g., the memory 128) reserved for use as a disk cache for the first server 102, as explained further below. The term "disk cache" as used herein refers to semiconductor memory used as a temporary storage for another memory (e.g., a disk drive). Disk cache may be use to improve the performance of the disk drive by reducing a number of physical accesses to a disk for duplicative read requests. Various embodiments of the present invention use a write-through cache policy in which data blocks associated with a write request are always stored both in the semiconductor memory and the disk. The write-through cache policy prevents a loss of data if the disk cache in not accessible. For example, if the second server were to fail, the data written to the disk cache is not lost because it is stored on the disk.

The primary caching driver 120 and the secondary caching driver 132 may be software packages that cooperate with each other to enable the use of the memory 128, as a disk cache, for the first server 102. The primary caching driver 120 and the secondary caching driver 132 interact through the connection 110. In one embodiment, the primary caching driver 120 and the secondary caching driver 132 may be built on an INFINIBAND networking architecture and form the connection 110. For example, the primary caching driver 120 and the secondary caching driver 132 are each implemented on top of an Internet Protocol over INFINIBAND (IPOIB) protocol. In one embodiment, the primary caching driver 120 and the secondary caching driver 132 are network block device drivers that use mapping information to access data blocks from the memory 128. Hence, the operating system 118 interacts with the primary caching driver 120 as a block device associated with the mapping information for locating various data blocks. The primary caching driver 120 and the secondary caching driver 132 should be stored on both the first server 102 and the second server 104 should the roles of the first server 102 and the second server 104 ever change (e.g., in case of a failure at the first server 102 or an administrative command). If a failure occurs at the first server 102, then the second server 104 must operate as the primary node in a primary/secondary node relationship with another server.

In operation, the primary caching driver 120 is configured to process data block read requests from the operating system 118. If the data block is cached within the cached data 134 in the memory 128, the data block is communicated to the first server 102 through the connection 110. Then, the data block is transmitted to the operating system 118 for further processing.

In one embodiment, the secondary caching driver 132 receives the data block read request from the primary caching driver 120. Notably, not every data block read request is communicated to the secondary caching driver 132. The secondary caching driver 132 reads the requested data block from the memory 128 (e.g., the cached data 134). For example, the secondary caching driver 132 uses mapping information (e.g., a representation of the allocation of data blocks in the memory 128) to retrieve the requested data block. Further, the secondary caching driver 132 communicates the requested data block to the first server 102 through the connection 110.

In one or more embodiments, a data block write request communicated to the secondary server 132 is cached in the cached data 134 in addition to being communicated to the disk driver 130 for storage in the storage device 106. In another embodiment, if the data block is determined not to be cached in the cached data 134 during the data block read request, the data block is cached in the cached data when it is retrieved from the storage device 106.

In one embodiment, the primary caching driver 120 and the secondary caching driver 132 are network block device drivers (e.g., server and client network block device drivers, respectively). The secondary caching driver 132 presents the cached data 134 as a block device to the first server 102. As such, the primary caching driver 120 interacts with the memory 128 using the network block device. Hence, block caching is enabled between the first server 102 and the second server 104.

In another embodiment, the primary caching driver 120 employs a Remote Direct Memory Access (RDMA) mechanism (e.g., a RDMA driver built over a INFINIBAND connection, such as the connection 110) to allow data blocks to be communicated directly between the memory 116 and the memory 128 without the operating system 118. RDMA is an access method that supports zero-copy networking by enabling the primary caching driver 120 and/or the secondary caching driver 132 to communicate the data blocks directly between the memory 116 and the memory 128, eliminating the need to copy data to data buffers associated with the operating system 118. The data blocks to be communicated require no additional processing by the first server 102 or the second server. Moreover, the data block transfers continue in parallel with other system operations. When the primary caching driver 120 initiates a RDMA Read or a Write request, the data blocks are communicated directly to the connection 110 which reduces latency and enables fast data block transfer. In one embodiment, only the primary caching driver 120 accesses data blocks from the disk. In one embodiment, the cached data 134 is pre-registered for INFINIBAND RDMA data block transfers.

According to one or more embodiments, the performance of the system 100 may be improved upon by various methods of disk cache management. According to various embodiments, disk cache management decisions are determined by the primary caching driver 120 and/or the secondary caching driver 132. In one embodiment, one or more algorithms that avoid duplicative caching may be employed. Such algorithms prevent caching of a data block if the data block already exists in another disk cache associated with the system 100 (e.g., operating system cache, application cache and the like). For example, an ORACLE database application may increase the size of an associated buffer cache through use of the memory 128 as additional cache. Accordingly, data blocks are not cached in the associated buffer cached by the ORACLE database application and in the cached data 134.

In another embodiment, the primary caching driver 120 and/or the secondary caching driver 132 improve the performance of the system 100 by employing one or more cache replacement algorithms such as, not recently used (NRU), first-in first-out (FIFO), least recently used (LRU) and the like.

In one embodiment, the primary caching driver 120 and/or the secondary caching driver 132 implement one or more caching policies. For example, the cached data 134 may be used for selective caching of specific data files (e.g., database files). As another example, only data blocks written to the data storage 106 are cached. Alternatively, only data blocks that are read from the data storage 106 are cached.

In another embodiment, the primary caching driver 120 and/or the secondary caching driver 132 pre-fetches one or more data blocks for communication to the first server 102. The primary caching driver 120 and/or the secondary caching driver 132 use mapping information to retrieve the one or more data blocks. As mentioned above, the mapping information represents the allocation of various data blocks in the cached data 134. In accordance with instructions from the primary caching driver 120 and/or a pre-fetching algorithm, the one or more data blocks are accessed and communicated to the first server 102.

It is appreciated that embodiments of the present invention are not limited in scope to the system 100 described above. For example, the system 100 may comprise a plurality of nodes instead of only two nodes as illustrated in FIG. 1. Embodiments of the present invention include the distribution of underutilized semiconductor memory resources within the plurality of nodes (e.g., a server cluster having a plurality of servers). In one embodiment, one or more underutilized semiconductor memories within one or more nodes of the plurality of nodes may be used as a disk cache for one or more primary nodes. Hence, each of the one or more primary nodes has an increased amount of available disk cache. Accordingly, load balancing of various operations conducted by the system 100 may be achieved through such a configuration.

Figure 2:
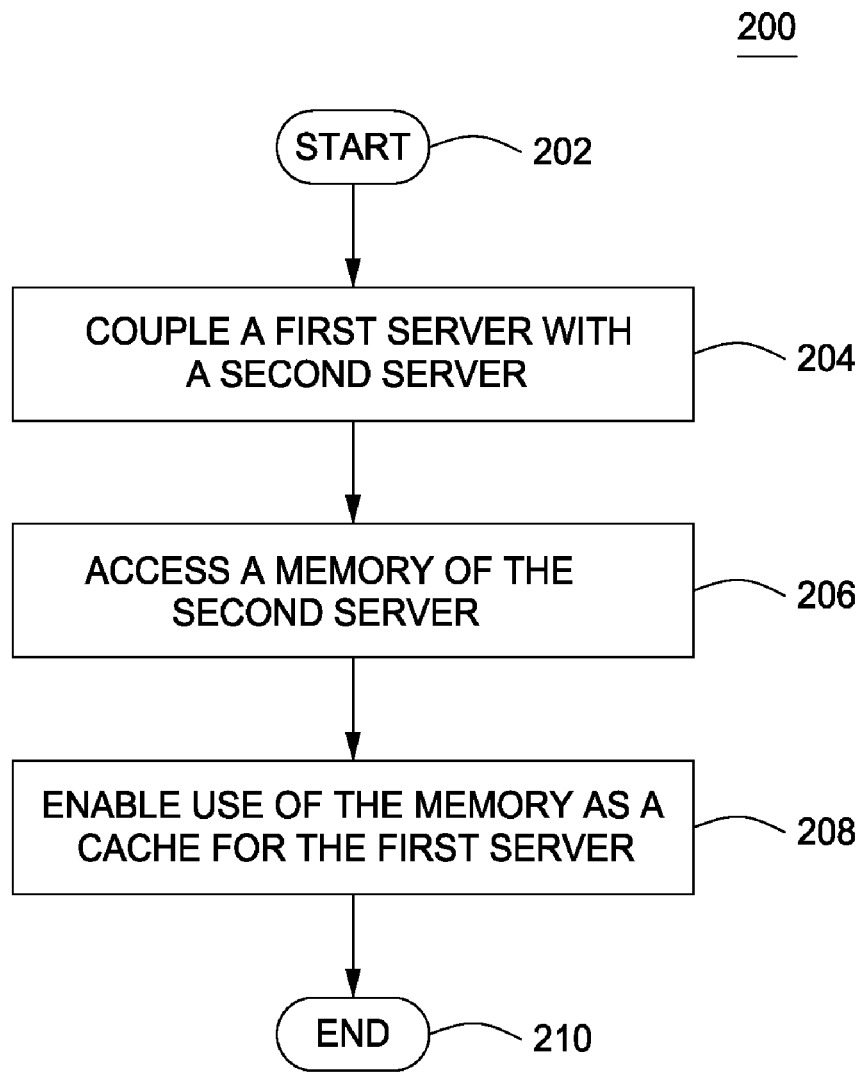
FIG. 2 is a flow diagram of a method for enabling use of a semiconductor memory as a disk cache for a first server, in accordance with one or more embodiments of the present invention.

FIG. 2 is a flow diagram of a method 200 for enabling use of the memory 128, of the second server 104, as a disk cache for the first server 102, according to one or more embodiments. The method 200 has been explained with reference to the system 100 of FIG. 1, but may be embodied in any other system in accordance with one or more embodiments.

The method 200 starts at step 202 and proceeds to step 204, at which the first server 102 is coupled with the second server 104 through the connection 110. In one embodiment, the primary caching driver 120 and the secondary caching driver 132 are network block device drivers. At step 206, the memory 128 of the second server 104 is accessed. In one embodiment, the primary caching driver 120 establishes control over the memory 128 of the second server 104 through the connection 110. At step 208, use of the memory 128 as a disk cache for the first server 102 is enabled. The method 200 ends at step 210.

Figure 3:
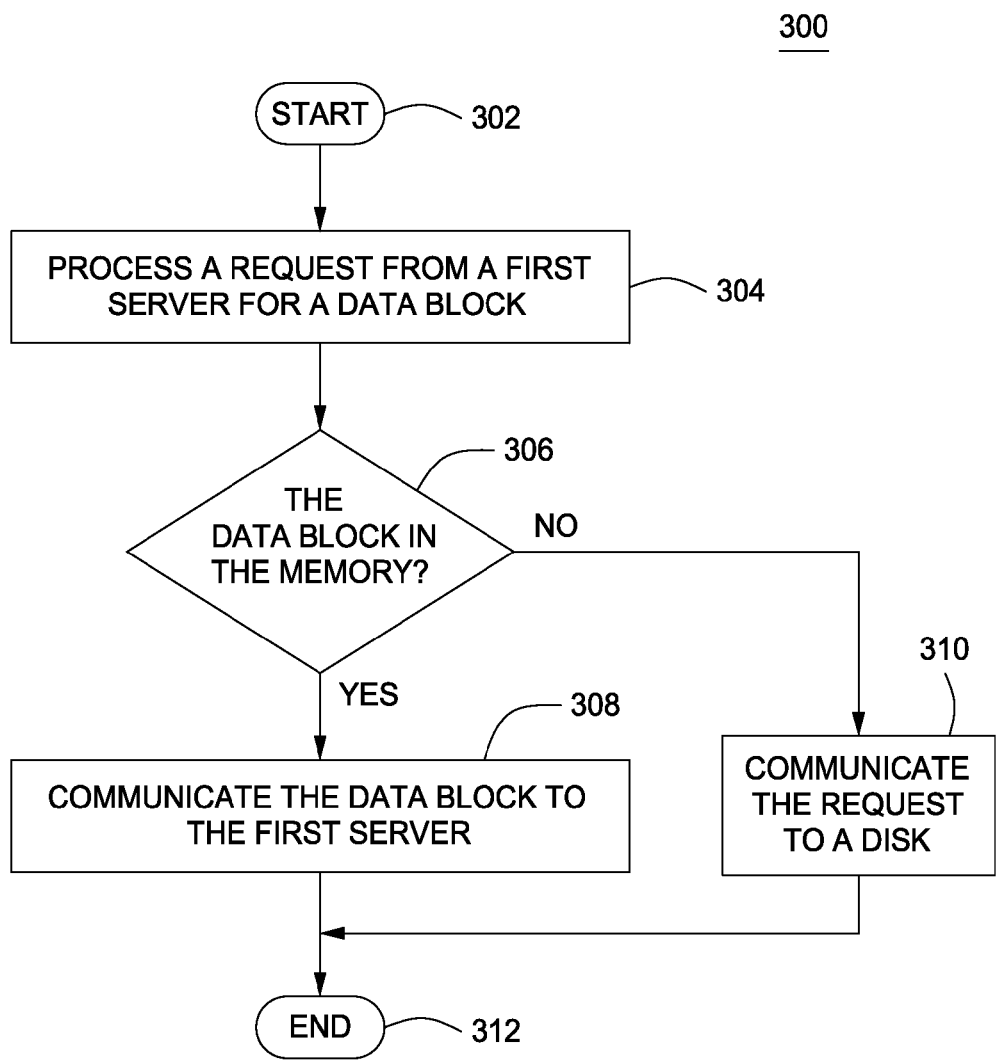
FIG. 3 is a flow diagram of a method for processing read requests from a first server, according to one or more embodiments of the present invention.

FIG. 3 is a flow diagram of a method 300 for processing read requests from the first server 102, in accordance with one or more embodiments.

The method 300 starts at step 302 and proceeds to step 304, at which a request from the first server 102 for a data block is processed. In one embodiment, the primary caching driver 120 communicates the request for the data block to the secondary caching driver 132 through the connection 110.

At step 306, a determination is made as to whether a data block resides in the cached data 134, of the memory 128. If the data block resides in the cached data 134 (option "YES"), then the method 300 proceeds to step 308. At step 308, a requested data block, present in the cached data 134, is communicated to the first server 102 through the connection 110. If, at step 306, it is determined that requested data block does not reside in the cached data 134 (option "NO"), then the method 300 proceeds to step 310. At step 310, the request is communicated to the storage device 106. The requested data block is accessed and retrieved from the storage device 106 through the network 108. The method 300 ends at step 312.

Consequently, use of one or more embodiments of the present invention enables the memory resources of a secondary server within a cluster to be more fully utilized. Such use facilitates expanded disk cache of a primary server, thus enhancing the operation of the primary server.

While the foregoing is directed to embodiments of the present invention, other and further embodiments of the invention may be devised without departing from the basic scope thereof, and the scope thereof is determined by the claims that follow.

The invention claimed is:

1. A method, comprising:
   establishing a relationship between a first server and a second server, wherein
      the relationship designates the first server as a primary server and the second server as a secondary server;
   configuring a semiconductor memory of the secondary server as a disk cache for the primary server;
   generating a storage access request at the first server;
   routing the storage access request through a communication link to the second server;
   performing the storage access request using the semiconductor memory of the second server; and
   upon failure of the first server, establishing a new relationship between the second server and a third server, wherein
      the new relationship designates the second server as the primary server and the third server as the secondary server.

2. The method of claim 1, wherein
   the configuring the semiconductor memory of the second server further comprises:
   the first server establishing control over the semiconductor memory of the second server.

3. The method of claim 1, wherein the performing the storage access request further comprises:
   processing the storage access request from the first server, wherein
      the storage access request comprises a read request for a data block;
   determining the data block resides in the semiconductor memory of the second server; and
   communicating the data block to the first server through the communication link.

4. The method of claim 1, wherein the performing the storage access request further comprises:
   processing the storage access request from the first server, wherein
      the storage access request comprises a read request for a data block;
   determining the data block does not reside in the semiconductor memory of the second server; and
   communicating the storage access request to a disk.

5. The method of claim 1, wherein the performing the storage access request further comprises:
  processing the storage access request from the first server, wherein
    the storage access request comprises a write request for a data block;
  storing the data block in the semiconductor memory as cached data; and
  communicating the data block to a disk.

6. The method of claim 5, further comprising managing the cached data in accordance with a caching policy to increase a speed of the performance of the storage access request.

7. The method of claim 1, further comprising pre-fetching at least one data block from the semiconductor memory of the second server for communication to the first server.

8. The method of claim 1, wherein performing the storage access request further comprises:
  generating a block device using a portion of the semiconductor memory of the second server; and
  presenting the block device to the first server.

9. The method of claim 1, further comprising coupling the first server with the second server using the communication link.

10. An apparatus, comprising:
  a logic in a first server, wherein the logic is configured to establish a relationship between the first server and a second server, wherein the relationship designates the first server as a primary server and the second server as a secondary server;
  a primary caching driver in the first server, wherein the primary caching driver is configured to configure a semiconductor memory of the secondary server as a disk cache for the primary server, and
    communicate a storage access request to the second server, wherein
      the storage access request is communicated to the second server via a communication link that couples the first server with the second server; and
  a secondary caching driver in the first server, wherein
    the secondary caching driver is configured to perform a received storage access request from an other primary caching driver on a third server using a semiconductor memory on the first server, wherein
      the semiconductor memory on the first server is configured by the other primary caching driver as a disk cache for the third server, and
    upon failure of the third server, switch to the primary caching driver on the first server.

11. The apparatus of claim 10, wherein the secondary caching driver is further configured to
  generate a network block device using a portion of the semiconductor memory of the first server, and
  present the network block device to the third server.

12. The apparatus of claim 10, wherein the secondary caching driver is further configured to
  read a data block from the semiconductor memory of the first server, wherein
    the received storage access request from the other primary caching driver comprises a read request for the data block, and
  communicate the data block to the other primary caching driver.

13. The apparatus of claim 10, wherein the secondary caching driver is further configured to
  determine an absence of a data block in the semiconductor memory of the first server, wherein
    the received storage access request from the other primary caching driver comprises a read request for the data block, and
  communicate the read request to a disk driver.

14. The apparatus of claim 10, wherein the secondary caching driver is further configured to
  store a data block in the semiconductor memory of the first server, wherein
    the received storage access request from the other primary caching driver comprises a write request for the data block, and
  communicate the write request to a disk driver.

15. A system, comprising:
  a first node, comprising:
    a logic, wherein the logic is configured to establish a relationship between the first node and a second node, wherein the relationship designates the first node as a primary node and the second node as a secondary node;
    a primary caching driver, wherein the primary caching driver is configured to configure a semiconductor memory of the secondary node as disk cache for the primary node, and
      communicate a storage access request to the second node;
  a communication link that connects the first node to the second node; and
  the second node, comprising:
    a secondary caching driver, wherein the secondary caching driver is configured to
      perform the storage access request from the primary caching driver using the semiconductor memory of the second node, and
      upon failure of the first node, switch to an other primary caching driver; and
    the other primary caching driver, wherein the other primary caching driver is configured to
      establish a new relationship between the second node and a third node, wherein
        the new relationship designates the second node as the primary node and the third node as the secondary node.

16. The system of claim 15, further comprising a plurality of nodes, wherein the plurality of nodes comprises the first node, the second node, and the third node.

17. The system of claim 15, wherein the secondary caching driver is further configured to
  generate a network block device using the semiconductor memory of the second node, and
  present the network block device to the first node.

18. The system of claim 15, wherein the secondary caching driver is associated with mapping information, wherein the mapping information represents an allocation of at least one data block in the semiconductor memory.

19. The system of claim 15, wherein the secondary caching driver is further configured to
  read a data block from the semiconductor memory, wherein
    the storage access request comprises a read request from the primary caching driver, and
  communicate the data block to the first node.

20. The system of claim 15, wherein the secondary caching driver is further configured to
  determine an absence of a data block in the semiconductor memory, wherein
    the storage access request comprises a read request from the primary caching driver, and
  communicate the read request to a disk driver.

* * * * *